INVENTORS
EMILE LABIN
PIERRE R. R. AIGRAIN
BY Percy P. Lantzy
ATTORNEY

INVENTORS
EMILE LABIN
PIERRE R. R. AIGRAIN
BY
Percy P. Lantzy
ATTORNEY 2,759,998

PULSE COMMUNICATION SYSTEM

Emile Labin, New York, N. Y., and Pierre R. R. Aigrain, Paris, France, assignors to International Telephone and Telegraph Corporation, a corporation of Maryland Application October 26, 1951, Serial No. 253,296

8 Claims. (Cl. 178—43.5)

This invention relates to pulse code communication systems and has particular reference to translating devices for performing translations between amplitude modulated signals and pulse code signals.

Numerous systems using the standard binary code have been described in the patent and other literature, for example, U. S. Patents 2,438,908 to Goodall granted April 6, 1948, for "Pulse Code Modulation Communication System," and 2,449,467, granted September 14, 1948, for "Communication System Employing Pulse Code Modulation." The advantages of this standard binary code have been pointed out in the literature. However, for different uses it has been found that other codes have their own individual advantages.

An object of the present invention is the provision of a pulse communication system employing translators between amplitude modulated signals and pulse code signals which translators are adapted for different types of codes.

One type of code having special uses may be termed the constant duty ratio code. A constant duty ratio code is one in which the number of pulses in the code is always a constant. An example of such a code is a seven element code in which three pulses always appear in the code. An example of a table of a 35 level seven element constant duty ratio code is as follows:

TABLE I

*CDR code*

| | | | | | | | |
|---|---|---|---|---|---|---|---|
| 34 | 1110000 | 25 | 1001100 | 16 | 0110001 | 7 | 0011001 |
| 33 | 1101000 | 24 | 1001010 | 15 | 0101100 | 6 | 0010110 |
| 32 | 1100100 | 23 | 1001001 | 14 | 0101010 | 5 | 0010101 |
| 31 | 1100010 | 22 | 1000110 | 13 | 0101001 | 4 | 0010011 |
| 30 | 1100001 | 21 | 1000101 | 12 | 0100110 | 3 | 0001110 |
| 29 | 1011000 | 20 | 1000011 | 11 | 0100101 | 2 | 0001101 |
| 28 | 1010100 | 19 | 0111000 | 10 | 0100011 | 1 | 0001011 |
| 27 | 1010010 | 18 | 0110100 | 9 | 0011100 | 0 | 0000111 |
| 26 | 1010001 | 17 | 0110010 | 8 | 0011010 | | |

A particular advantage of constant duty ratio coding is found when transmitting through a medium poorly adapted to the transmission of low frequency signals (below 50 kilocycles, for example). Cables are an important example of such a medium.

In binary pulse code modulation transmission the lowest frequencies present in the transmitted signal are of the order of the lowest frequencies present in the modulated signals, usually for voice, about 300 cycles. This is due to the fact that the number of pulses present in each sampling may vary as for example from zero to 5. As a consequence it will be necessary, if good signal-to-noise ratio characteristics are desired to pass all frequencies down to about 300 cycles per second. On the other hand the constant duty ratio code corresponds to signals which contain only small components, except direct current, of a frequency lower than the sampling frequency, for example, for speech, 8000×N cycles per second, where N is the number of channels.

Although a 5 element standard binary code which corresponds to 32 levels has 5 code elements whereas the constant duty ratio code corresponding to 35 levels has 7 code elements, it is interesting to note that approximately the same band width is required for similar results. This is indicated in Table II.

TABLE II

*Comparison between binary and CDR codes (35 levels)*

| Code | Number of Code Elements | Number of Pulses Present per Sampling | Band Required (per channel) | Band Width, C. P. S. |
|---|---|---|---|---|
| Binary (32 levels) | 5 | 0–5 | 300–20,000 | 19,700 |
| CDR (35 levels) | 7 | 3 | 8000–28,000 | 20,000 |

The effect of the constant duty ratio code is to displace the required band in a direction making it particularly well adapted for cable transmission.

It is therefore a further object of the present invention to provide a system of communication having a translator producing a constant duty ratio code.

In general the coder for the present invention may be described as follows:

The signal is sampled at regularly repeated intervals. By "sampling" is meant the measurement, production, or storage of an electrical quantity proportional to the instantaneous value of the signal at the time the sample is taken. These samples are preferably taken at regularly repeated intervals at a sufficiently rapid rate to give the desired accuracy of definition of the signal which is to be transmitted. Between the taking of one sample and the next, an entire code group is produced representative of the first-mentioned sample.

In producing a code group representing a given sample, the sample is compared with a first wave form which wave form varies in value in a manner which will be hereinafter described. These comparisons are repeated at regular intervals until a certain relationship is found to exist, as for example, the sample is greater than the instantaneous value of the wave form. When this relationship occures, a code pulse is transmitted towards the receiver, and the sample is reduced by the amount of the instantaneous wave form value. The reduced sample is next compared with a second wave form at regular intervals until the reduced sample bears said relationship to the instantaneous value of the second wave form whereupon a second pulse is transmitted, and the reduced sample is further reduced by the amount of said instantaneous value of the second wave form. The further reduced sample is next repeatedly compared with a third wave form until said relationship again occurs whereupon a third pulse is transmitted. The number of comparisons is equal to the number of elements of the code. Thus if the code is a 7 element code, 7 comparisons take place. The number of different wave forms employed depends upon the number of pulses that are always transmitted. For example, in a constant duty ratio code in which three pulses are always transmitted with each code group, three different wave forms will be employed.

After a code group representing a given sample has been produced, a fresh sample is taken which is compared with the first wave form then the second, and then the third in the manner hereinabove described. The manner in which the different wave forms vary differently depends upon the code which is employed. An example of a representative set of wave forms for a 7 element code having a three pulse constant duty ratio will be described hereinafter.

In general, the pulse decoder for a code of the type hereinabove described may consist of an adding circuit, which adds selected instantaneous voltages from a plurality of predetermined wave forms, the selection being made in accordance with the position of the received pulses in each code group of pulses, the predetermined wave forms being similar to those used in the transmitter.

The above-mentioned and other features and objects of this invention and the manner of attaining them will become more apparent by reference to the following description of an embodiment of the invention taken in conjunction with the accompanying drawings, wherein.

Figure 1:
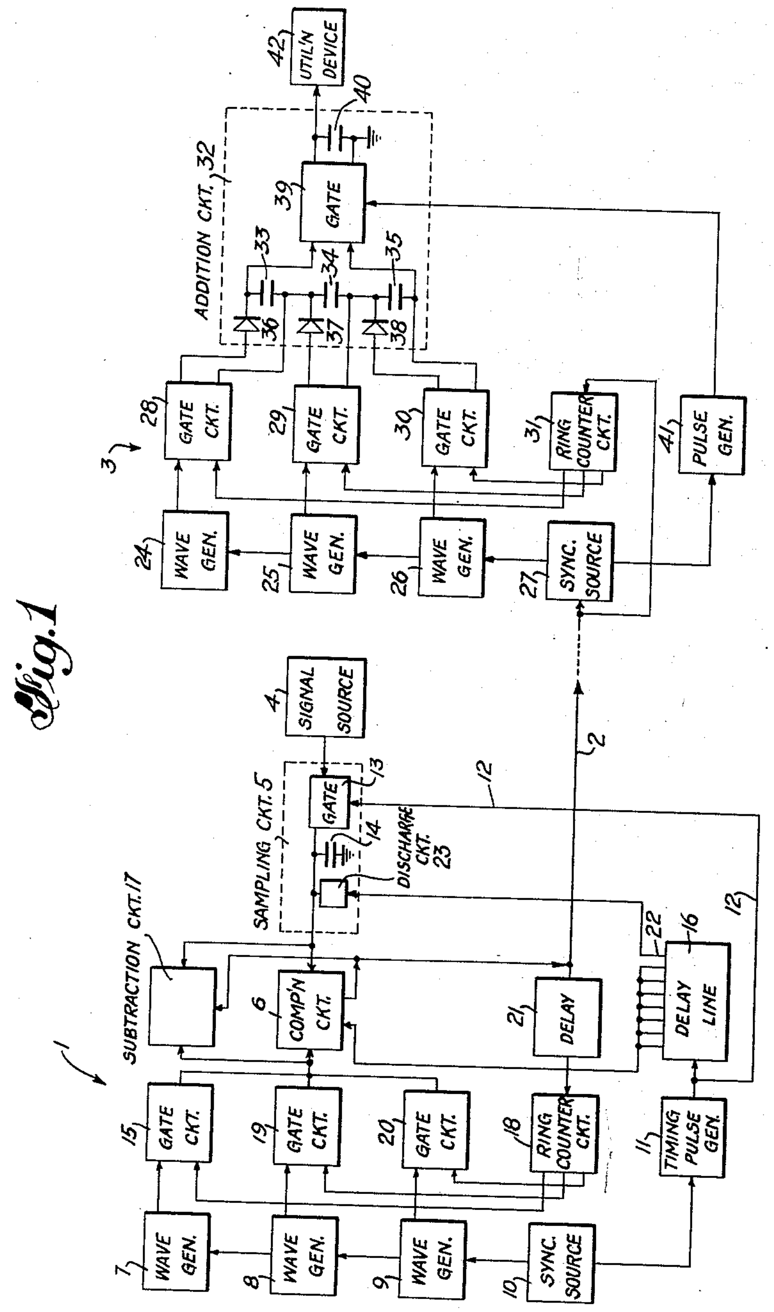
Fig. 1 is a schematic and block diagram of a pulse code communication system in accordance with the present invention showing both a coder and decoder.

Referring to the drawings, and particularly to Fig. 1, a pulse code transmitter 1 is shown connected by a transmission line 2, which for example, may comprise a cable, to a pulse code receiver 3.

The pulse code transmitter includes a source 4 of amplitude modulated signals which are sampled at regular intervals in the sampling circuit 5 and then compared in the comparison circuit 6 with voltages from the first wave form generator 7. Whenever at one of said comparisons the sampled voltage is greater than the instantaneous voltage derived from wave generator 7, and a pulse is transmitted from the output of the comparison circuit 6, the sample is reduced by the value of the voltage from wave generator 7 and the next wave generator 8 is connected for comparison with the reduced sample. Comparisons between the voltage from wave generator 8 and the reduced sample in the sampling circuit are continued at regular intervals until the reduced sample is greater than the instantaneous value of the compared voltage whereupon another pulse is transmitted from comparison circuit 6. The sample is still further reduced in sampling circuit 5 by an amount equal to the value of the voltage from wave generator 8 at that instant, and wave generator 9 is then connected to the comparison circuit for comparison with the still further reduced sample. Regularly repeated comparisons between said further reduced sample and the voltages from wave generator 9 are continued until the voltage of the generator is less whereupon another pulse is transmitted from the comparison circuit. The maximum number of comparisons is, in the present example, seven. Afterwards, whatever remains of the sampled voltage is dissipated and a new sample is taken.

The timing of the various operations may be controlled by a wave from a synchronizing source 10 which is used to control a timing pulse generator 11 whose output pulses are regularly fed over line 12 to a gate 13 in sampling circuit 5. The gate 13 is normally blocked but upon being opened by a pulse from pulse generator 11 connects the signal source 4 to a storage condenser 14 in which the instantaneous value of the signal is used to charge the condenser to a voltage proportional to the signal's instantaneous value. The storage condenser 14 is connected to the comparison circuit 6, to which the wave generator 7 is likewise connected through a gate circuit 15. The comparison circuit is normally blocked and does not function to produce a comparison output until actuated by a pulse derived from timing pulse generator 11 via a delay line 16 which is provided with a number of taps all connected to the comparison circuit and arranged at regular intervals along the delay line so as to periodically actuate said comparison circuit. In the present example there are seven regularly spaced delay taps connected to the comparison circuit so that seven comparisons are produced.

The comparison circuit 6 is preferably of the type which sends out a sharp pulse when the sampled voltage is found at one of the comparisons to be of greater value than the instantaneous value of the wave with which it is being compared. This pulse is then sent out along transmission line 2 and actuates two other circuits, a subtraction circuit 17 and a ring counter circuit 18. The subtraction circuit

17 which may be of known conventional form is connected between the input of the comparison circuit and condenser 14 in the sampling circuit, and subtracts from the charge on condenser 14 a voltage equal to the instantaneous value of the voltage applied by the wave generator to the input of the comparison circuit, thus reducing the value of the sample. The ring counter circuit 18 serves to control the opening and closing of gate circuits 15, 19, and 20 thereby controlling the connection of wave generators 7, 8, and 9 to the comparison circuit 6. As stated hereinbefore gate circuit 15 is open at the beginning of a cycle of coding. As soon as a pulse is sent out by comparison circuit 6 it operates the ring counter circuit 18 so that gate 19 is next opened whereas the other two gates are closed. After comparisons have been made with the wave from wave generator 8 and a pulse is sent out by comparison circuit 6, the ring circuit is again operated to open gate 20 and close gates 15 and 19 thereby connecting wave generator 9 to the comparison circuit. Immediately before this, however, the sample has been further reduced because the output pulse from comparison circuit 6 has also been applied to the subtraction circuit 17. In order to prevent the ring circuit from being operated too soon, that is before the subtraction has occurred, a slight delay may be applied to the pulse being fed to the ring circuit from the output of comparison circuit 6, by delay device 21. After seven comparisons have been made under the control of the pulse travelling along delay line 16, and pulses have been sent out from the comparison circuit 6, the pulse along the delay line 16 finally reaches the last tap 22 and is fed from this tap to operate discharge circuit 23 in the sampling circuit 4 so as to reduce the charge on condenser 14 to a given reference level.

Suitable comparison circuits, and subtraction circuits of the type herein described may be found in the book on Wave-forms by Radiation Labs. Series No. 19, published by McGraw-Hill Co. Other types may be found on the patent to which reference has been made hereinabove.

Figure 3:
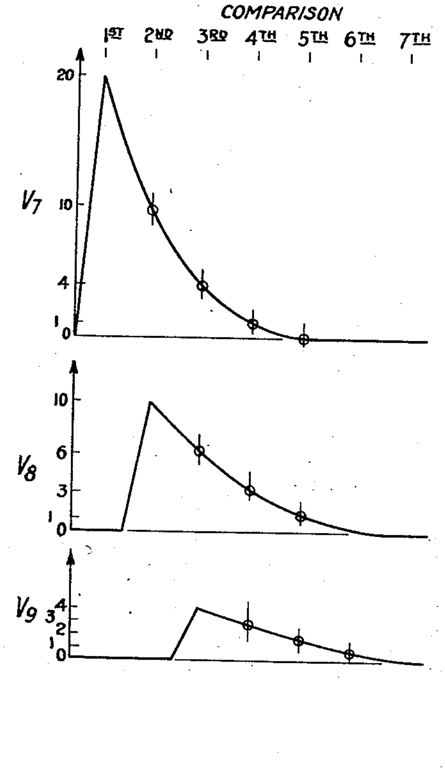
Fig. 3 is a graphic illustration of the wave form in one example.

A specific numerical example will make the operation of the system clearer. Referring to Fig. 3 the three wave forms from voltage generators 7, 8, 9 are labelled as $V_7$, $V_8$, and $V_9$ respectively. The wave forms are declining saw-tooth wave forms and the voltages along the ordinate are plotted against the time of the successive comparisons along the abscissa. The following chart shows in table form the same information.

| | $V_7$ | $V_8$ | $V_9$ |
|---|---|---|---|
| 1st Comparison | 20 | -------- | -------- |
| 2nd Comparison | 10 | 10 | -------- |
| 3rd Comparison | 4 | 6 | 4 |
| 4th Comparison | 1 | 3 | 3 |
| 5th Comparison | 0 | 1 | 2 |
| 6th Comparison | -------- | 0 | 1 |
| 7th Comparison | -------- | -------- | 0 |

As an example, consider the coding of 16.2.

| | | | |
|---|---|---|---|
| 1st Comparison | $V_7=20$ | $V=16.2$ | no pulse. |
| 2nd Comparison | $V_7=10$ | $V=16.2$ | pulse. |
| 3rd Comparison | $V_8=6$ | $V=6.2$ | Do. |
| 4th Comparison | $V_9=3$ | $V=.2$ | no pulse. |
| 5th Comparison | $V_9=2$ | $V=.2$ | Do. |
| 6th Comparison | $V_9=1$ | $V=.2$ | Do. |
| 7th Comparison | $V_9=0$ | $V=.2$ | pulse. |

The resulting code (0110001) is seen to correspond to 16, as should be.

A similar apparatus may be used for decoding, the prime difference being that in place of the sampling circuit, comparison circuit and subtraction circuit there is provided an adding circuit. Three wave generators 24, 25, and 26 produce waves similar to those produced by wave generators 7, 8, and 9 respectively and are controlled by a synchronizing wave source 27 which produces a wave similar to that from synchronizing source 10.

The synchronizing source 27 is itself controlled by the input signal and may be synchronized with the synchronizing source 10 by any suitable means, such as for example a separate wave or by a specially characterized pulse or by a separate one of the signal channels if the signals being transmitted from signal source 4 are multi-channel signals. Any other known and suitable form of synchronizing may be employed according to the convenience.

The output from wave generators 24, 25, and 26 is gated through gates 28, 29, and 30 similar to gates 15, 19, and 20 respectively, said gates 28, 29, and 30 being controlled by a ring counter circuit 31. The ring counter circuit 31 is actuated by the incoming pulses. The first incoming pulse along transmission line 2 causes the ring counter circuit 31 to send a pulse to gate circuit 28 opening said gate circuit 28 for a short length of time and then closing it. The next incoming pulse from transmission line 2 sends a pulse to open gate circuit 29 for a short interval of time and then closes it. The third incoming pulse from transmission line 2 sends a pulse to gate circuit 30 which opens gate circuit 30 for a short interval of time and then closes it. Each of the gate circuits when open connects its corresponding wave generator to an addition circuit where the instantaneous values of the wave from said generators are added. The addition circuit 32 may be any suitable form, such as for example the one illustrated in Fig. 1. In this form the addition circuit consists of three condensers 33, 34, and 35 connected in series with each other but each connected to a separate one of gate circuits 28, 29, and 30 respectively, via isolating rectifiers 36, 37, and 38 respectively. It will be seen that each wave generator charges a separate condenser and that the output of the condensers 33 to 35 is then added together because of their series connection. The output of the series connection of the condensers is connected via a normally closed gate 39 to an integrating condenser 40. At the end of each code group when the condensers 33, 34, and 35 have been charged to the proper amount a pulse from a pulse generator 41 controlled by sync source 21 opens the gate 39 and sends the added value of all the condensers through to the output which is smoothed by the integrating condenser 40, the output in turn being connected to any suitable utilization device 42, which may be for example a channel-separating arrangment and demodulator to produce a resultant amplitude modulated output.

A numerical example will make the operation of the decoder clear. The decoding of 12, for example, will proceed as follows:

| | | | |
|---|---|---|---|
| Pulse No. | 1 | Absent | |
| | 2 | Present | $V_{24}=10$ |
| | 3 | Present | $V_{25}=6$ |
| | 4 | Absent | |
| | 5 | Absent | |
| | 6 | Absent | |
| | 7 | Present | $V_{26}=0$ |
| Total | | | $=16$ |

Figure 2:
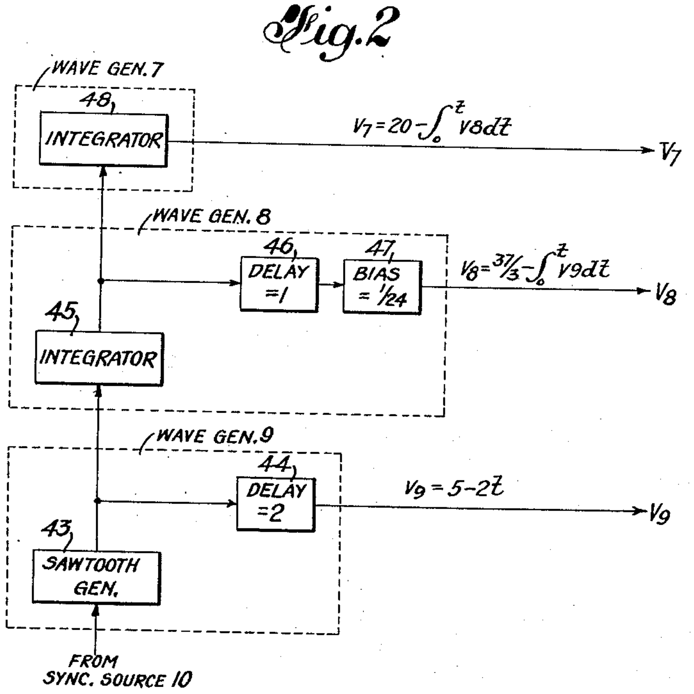
Fig. 2 is a schematic diagram showing an arrangement for producing the predetermined wave forms.

Referring to Figs. 2 and 3, the wave generators 7–9 and 24–26, Fig. 1, may be constructed in accordance with the following description of generators 7, 8, and 9. Wave generator 9 consists of a saw-tooth generator 43 which produces repeatedly a waveform such as shown in Fig. 3 and designated as $V_9$. In the showing of $V_9$, however, this wave form is delayed by an interval equal to the time of two comparisons and for this purpose a delay device 44 is coupled to the output of the saw-tooth 43. The voltage $V_9$ varies according to the formula $V_9=5-2t$ where $t$ represents each comparison period. At the first comparison time, $t$ is equal to 1, at the second comparison period, $t$ is equal to 2, etc. The undelayed output of the saw-tooth generator 43 is applied also to the wave generator 8, and more particularly to an amplifying integrator 45. This integrator operates to produce a voltage as follows:

$$V_8=\frac{37}{3}-\int_0^t V_9 dt$$

The output of the integrator 45 is applied to a delay device 46 equal to a delay of one comparison period, and then to it is added a bias equal to 1/24 of a voltage unit to produce the resulting wave form $V_8$ as shown in Fig. 3. The output of the integrator 45 is also directly applied to the wave generator 7 which includes a similar amplifying integrator 48 operating according to the law, $$V_7=20\int_0^t V_8 dt$$

The resultant output is $V_7$ indicated in Fig. 3. The output of the integrator 48 is not delayed but is directly applied to its gate circuit.

The integrating amplifiers 45 and 48 may comprise a known type, for example, a Miller type amplifier integrator followed by a resistance voltage divider one end of which is returned to a bias voltage supply, the value of the bias and the voltage divider ratio being adjusted to give the proper value for the constant.

While we have described in detail one form of carrying out our invention, it will be apparent that numerous other forms may be used for this purpose. For example it will be apparent that while we have disclosed this apparatus as produced in constant duty ratio code it may also be used to produce numerous other forms of code, great flexibility being characteristic of the system because of the idea of using different wave forms for the comparison purpose.

Accordingly while we have described above the principles of our invention in connection with specific apparatus, it is to be clearly understood that this description is made by way of example only and not as a limitation to the scope of the invention.

We claim:

1. In a pulse communication system, a signal wave source, means for sampling instantaneous amplitudes of a signal wave at rapidly recurring instances of time, a source of synchronizing timing pulses to control the operation of said sampling means, a standard comparison wave source including a plurality of wave generators controlled by said synchronizing pulse source to produce voltage waves of different magnitude having predetermined voltage decreasing characteristics, a comparison circuit, gating means for coupling said wave generators to said comparison circuit, a timing circuit for controlling said gating circuits in a predetermined relationship whereby each signal sample is compared successively with each of the standard comparison waves of said wave generators, means controlling the operation of said comparison circuit for comparing said signal sample in a successive manner in accordance with a predetermined number of pulse positions per code signal, means to produce a given output pulse during each comparison operation where the signal sample exceeds in magnitude the instantaneous magnitude of the standard comparison wave with which it is being compared and means incident to each comparison operation for reducing the magnitude of said signal sample by an amount determined by the instantaneous magnitude of said standard comparison wave at the time of the comparison operation.

2. A pulse communication system having code signals with a first given number of pulse positions and a second given number of pulses, said given number always being less than first said given number by a predetermined amount, comprising a source of amplitude modulated signals, means for storing a sample voltage corresponding to the instantaneous magnitude of the signal at a given instant, a plurality of sources of standard comparison waves corresponding in number to said second given number, said standard waves each having a decreasing voltage characteristic, a comparison circuit for making repeated comparisons between the sample and the instantaneous magnitudes of whichever of said standard waves is applied to said comparison circuit and producing an output pulse in response to the existence of a predetermined relationship therebetween, coupling means responsive to the occurrence of an output pulse for coupling a succeeding standard wave source to said comparison circuit, means also responsive to occurrence of an output pulse for reducing the magnitude of the sample by an amount equal to the instantaneous magnitude of the standard wave being compared at the time said pulse was produced, means for transmitting the output pulses as a code signal to a receiver, receiving means responsive to the pulses of a code signal for adding voltages, a plurality of sources of voltage waves at said receiver corresponding to the standard wave sources at the transmitter, means for applying the instantaneous magnitudes of said voltage waves to said adding means in accordance with the time occurrence of pulses in said code signal to reproduce a voltage corresponding in magnitude substantially to the magnitude of the original sample represented by said code signal.

3. In a pulse communication system employing pulse code signals composed of a given number of pulse positions but being limited to a constant number of pulses which is less than said number of pulse positions by a predetermined amount, each code signal representing an instantaneous magnitude of a signal wave; receiving means comprising a voltage wave source, means synchronizing said voltage source to reception of a pulse code signal for producing voltage waves of different magnitude voltage decreasing characteristics, means for adding voltages, and means to apply an instantaneous value of said voltage waves to said adding means in accordance with the occurrence of the pulses of a pulse code signal to produce substantially the voltage corresponding to the instantaneous magnitude of the signal wave represented by the code signal, said voltage adding circuit including a plurality of storage condensers, one of each voltage waves of said source, means controlling the storage of energy on said condenser from said voltage waves in accordance with the occurrence of pulses in said code signal and means to discharge said condensers in series incident to reception of each code signal.

4. In a pulse communication system for transmission of instantaneous amplitude signal samplings in a constant duty ratio code, comprising a source of synchronizing pulses one for each code signal, said code signal being characterized by having a first given number of pulse positions and a second given number of pulses with said second given number less than said first given number, a first means operative incident to the occurrence of a synchronizing pulse to store a sample voltage corresponding to the instantaneous amplitude of said signal, means to provide sawtooth voltage waves of predetermined magnitude, a voltage comparison means coupled to said signal storage means, a second means operative incident to the occurrence of said synchronizing pulse to apply one of said sawtooth waves to said comparison means for periodic comparison with the stored signal voltage coupled thereto, said comparison means being operable to produce an output pulse during each comparison operation in which said stored signal sample exceeds the portion of the sawtooth wave with which it is compared and no pulse when such sawtooth wave exceeds the stored signal sample with which it is compared, means operative incident to the occurrence of an output pulse to subtract from said stored voltage sample the voltage value of the sawtooth wave exceeded thereby and further means operative incident to the occurrence of said output pulse to apply the next succeeding sawtooth wave to said comparison means.

5. A pulse communication system according to claim 4, wherein the means for producing said sawtooth waves includes means to produce a third sawtooth voltage wave, means to produce a second sawtooth wave of a magnitude exceeding said third sawtooth wave by a given amount, means to produce a first sawtooth wave exceeding said second sawtooth wave by a predetermined amount, means to delay the time position of said third wave one unit of time with respect to said first sawtooth wave, and means to delay said second wave with respect to said first sawtooth wave by a given fraction of said unit of time.

6. In a pulse communication system for transmission of instantaneous amplitude signal samplings in a constant duty ratio code, comprising a source of synchronizing pulses one for each code signal which is characterized by having a first given number of pulse positions and a second given number of pulses, said second given number being less than said first given number, a first means operative to the occurrence of a synchronizing pulse to store a sample voltage corresponding to the instantaneous amplitude of said signal, means to provide a plurality of standard voltage waves having decreasing voltage characteristics, a voltage comparison means coupled to said signal storage means to selectively apply said standard voltage waves to said comparison means, a second means operative incident to the occurrence of said synchronizing pulse to produce a series of time delayed pulses corresponding in number to said first given number of pulse positions, means to apply said series of time delayed pulses to said comparison means to control the comparison operation thereof, said comparison means being operable to produce an output pulse during each comparison operation in which said stored signal sample exceeds the magnitude of the standard voltage wave with which it is compared and no pulse when such wave magnitude exceeds the stored signal sample with which it is compared, and means operative incident to the occurrence of an output pulse to subtract from said stored voltage sample the voltage wave magnitude exceeded thereby and to apply to said comparison means the next succeeding voltage wave.

7. In a pulse communication system for transmission of instantaneous amplitude signal samplings in a constant duty ratio code, comprising a source of synchronizing pulses one for each code signal, said code signal being characterized by having a first given number of pulse positions and a second given number of pulses with said second given number less than said first given number, a first means operative incident to the occurrence of a synchronizing pulse to store a sample voltage corresponding to the instantaneous amplitude of said signal, means to provide standard voltage waves of predetermined magnitude and of decreasing voltage characteristics, a voltage comparison means coupled to said signal storage means, a second means operative incident to the occurrence of said synchronizing pulse to apply one of said standard waves to said comparison means for periodic comparison with the stored signal voltage coupled thereto, said comparison means being operable to produce an output pulse during each comparison operation in which said stored signal sample exceeds the portion of the standard wave with which it is compared and no pulse when such standard wave exceeds the stored signal sample with which it is compared, means operative incident to the occurrence of an output pulse to subtract from said stored voltage sample the voltage value of the standard wave exceeded thereby and further means operative incident to the occurrence of said output pulse to apply the next succeeding standard wave to said comparison means.

8. In a pulse communication system for transmission of instantaneous amplitude signal samplings in a constant duty ratio code, comprising a source of synchronizing pulses one for each code signal, said code signal being characterized by having a first given number of pulse positions and a second given number of pulses with said second given number less than said first given number, a first means operative incident to the occurrence of a synchronizing pulse to store a sample voltage corresponding to the instantaneous amplitude of said signal, means to provide standard voltage waves of predetermined magnitude and of decreasing voltage characteristics, a voltage comparison means coupled to said signal storage means, a second means operative incident to the occurrence of said synchrronizing pulse to apply one of said standard waves to said comparison means for periodic comparison with the stored signal voltage coupled thereto, said comparison means being operable to produce an output pulse during each comparison operation in which said stored signal sample exceeds the portion of the standard wave with which it is compared and no pulse when such standard wave exceeds the stored signal sample with which it is compared, means operative incident to the occurrence of an output pulse to subtract from said stored voltage sample the voltage value of the standard wave exceeded thereby, and further means operative incident to the occurrence of said output pulse to apply the next succeeding standard wave to said comparison means; and a receiving means for receiving and decoding said code signals comprising a voltage wave source, means synchronizing said voltage source to reception of said code signals for producing voltage waves corresponding to said standard waves, means for adding voltages, and means to apply instantaneous voltage values of said voltage waves to said adding means in accordance with pulse occurrence in a code signal to reproduce substantially the voltage corresponding to the sample of said signal wave represented by said code signal.

References Cited in the file of this patent

UNITED STATES PATENTS

| | | |
|---|---|---|
| 2,183,147 | Moore | Dec. 21, 1939 |
| 2,449,467 | Goodall | Sept. 14, 1948 |
| 2,521,733 | Lesti | Sept. 12, 1950 |